June 2, 1942.  W. R. KOCH  2,284,747
ELECTRICAL MEASURING SYSTEM
Filed June 27, 1939   2 Sheets-Sheet 2
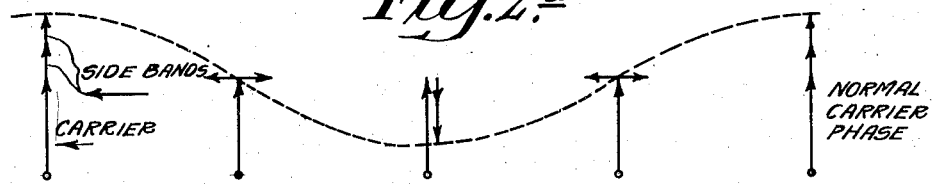
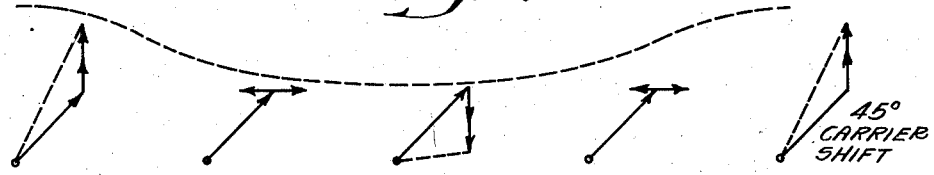
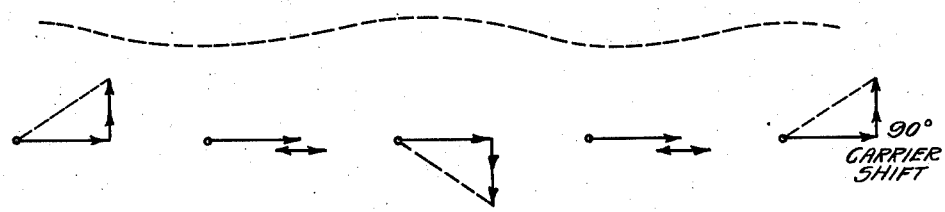
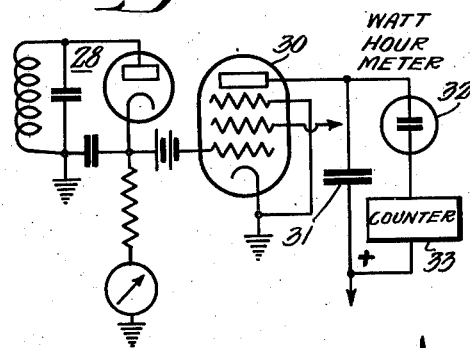
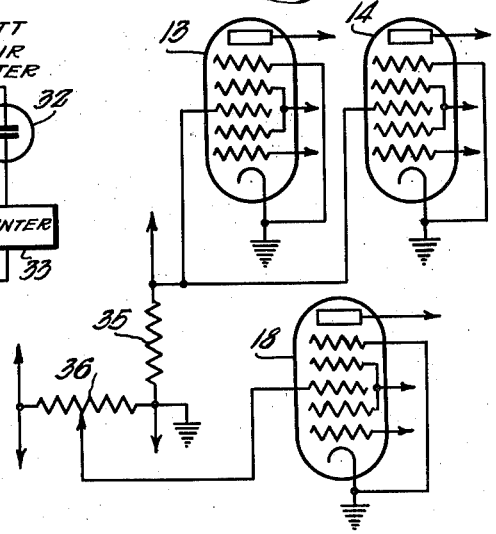
Inventor
Winfield R. Koch
By
Attorney Patented June 2, 1942

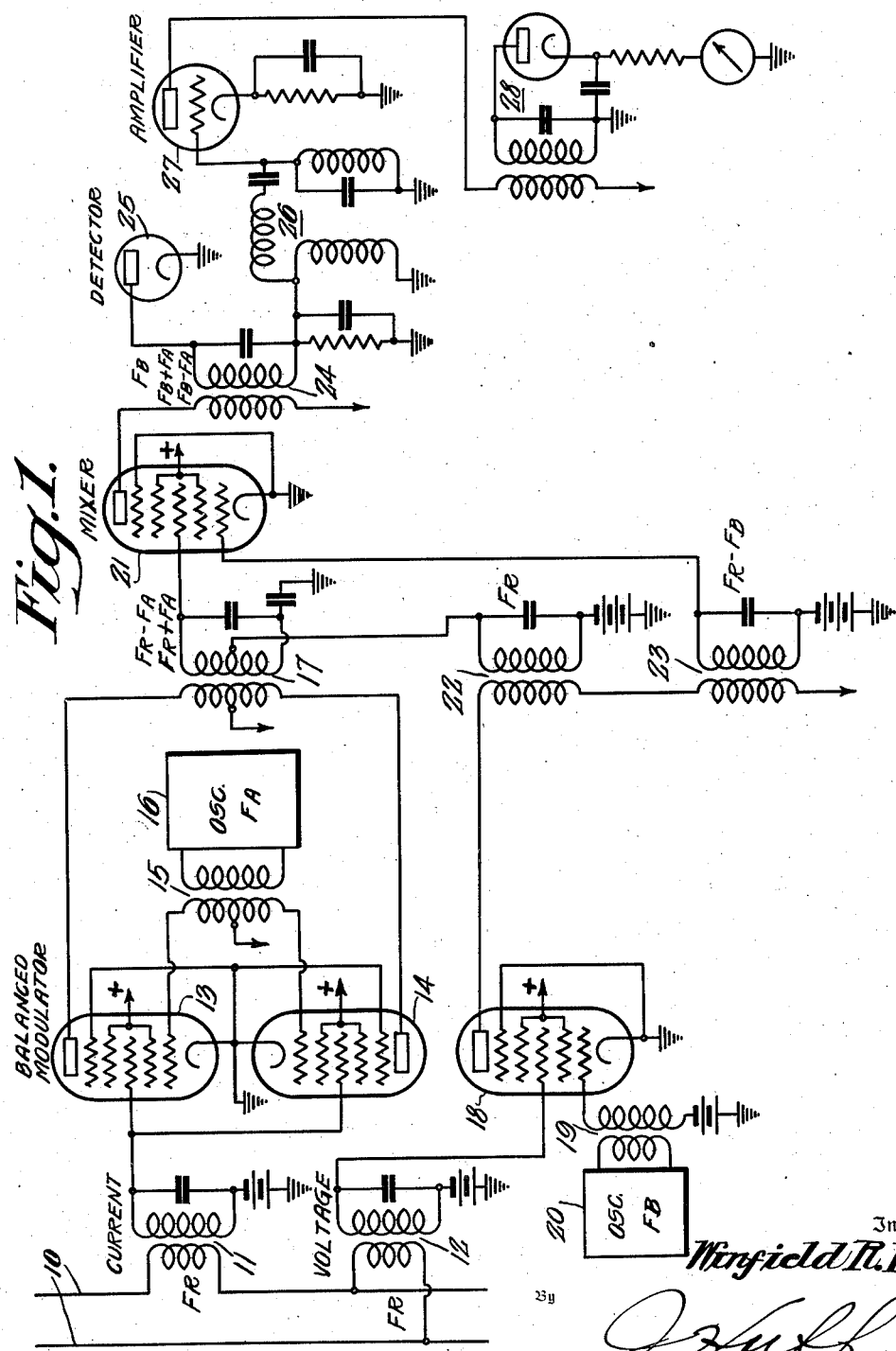

2,284,747

UNITED STATES PATENT OFFICE 2,284,747

ELECTRICAL MEASURING SYSTEM

Winfield R. Koch, Haddonfield, N. J., assignor to Radio Corporation of America, a corporation of Delaware Application June 27, 1939, Serial No. 281,334

8 Claims. (Cl. 171—95)

This invention relates to measuring systems such as are utilized to measure the electrical power delivered at radio frequencies, and has for its principal object the provision of an improved measuring system and method of operation whereby the power output of a radio frequency circuit may be readily determined, indicated or recorded.

The invention will be understood from the following description when considered in connection with the accompanying drawings, and its scope is indicated by the appended claims.

Referring to the drawings:

Figure 1 is a wiring diagram of a measuring system for indicating the power delivered by a radio frequency circuit, Figures 2a, 2b and 2c are vector diagrams relating to the operation of the system of Fig. 1, Figure 3 is a wiring diagram of a modified feature of the system, and Figure 4 is a wiring diagram of a modified input connection which may be substituted for that of Fig. 1.

It is well known that the electrical power delivered to any circuit is proportional to the product of the voltage and current and the cosine of the phase angle between the voltage and the current. The circuit of Fig. 1 provides an output current which is proportional to the power in the radio frequency circuit 10. The measuring system is so coupled to the circuit 10 that there is applied through a current transformer 11 a voltage which is proportional to the current, and through the transformer 12 a current which is proportional to the voltage of the circuit 10.

The radio frequency current responsive voltage is applied through the transformer 11 to the input circuit of a balanced modulator which includes the electron discharge devices 13 and 14, a transformer 15 and an oscillation generator 16 coupled through this transformer to the No. 1 grids of the devices 13 and 14. Assuming that the frequency at which the line 10 is operated is FR and the operating frequency of the oscillation generator 16 is FA, there are delivered at the balanced modulator output transformer 17 two side band frequencies $FR-FA$ and $FR+FA$. These two side bands have amplitudes proportional to the current of the line 10.

To these side bands is added a carrier FR which is proportional to the radio frequency voltage and is applied through the transformer 12 to the No. 3 grid of a mixer tube 18. If these three frequencies were to be put into a diode detector, the audio output would be proportional to the amplitude of the side bands and to the cosine of the angle between the suppressed and added carriers (provided the added carrier is large and the second harmonic of the audio output is filtered out); that is, the audio output would be proportional to $I \cos \theta$.

In order to make the output also proportional to E, these three frequencies are heterodyned with another frequency $FR-FB$, which is secured by subjecting the No. 1 grid of the device 18 to impulses of a frequency FB delivered from an oscillation generator 20 through a transformer 19.

For injecting these frequencies into the input circuit of a mixer device 21, there are provided the transformers 22 and 23. The output circuit of the mixer device is coupled through a transformer 24 to a detector 25. At the detector there appear the frequencies $FB$, $FB+FA$ and $FB-FA$. The side bands $FB-FA$ and $FB+FA$ have amplitudes proportional to EI and appear in the output circuit of the detector as a fundamental audio voltage which is proportional to $EI \cos \theta$.

With the carrier in the phase relation to the side bands which is normal for amplitude modulation, the alternating current in the output is proportional to the amplitude of the side bands and independent of the amplitude of the carrier as long as it is greater than the amplitude of the resultant of the side bands. This appears from the vector diagram of Fig. 2a, in which the side band frequencies are represented by small vectors rotating in opposite directions, the vector representing the carrier being indicated as stationary. It will be noted that the height of the envelope curve represents at all points the resultant of the carrier and side band vectors and that the carrier vectors could be lengthened indefinitely without affecting the variations in the envelope.

When the carrier is shifted in phase relative to the position illustrated by Fig. 2a, as indicated in Figs. 2b and 2c, the envelope variations decrease in amplitude and are distorted. Thus, at a 90° phase shift (Fig. 2c), the envelope has only a double frequency component. In order to avoid the errors due to the double frequency component, a low pass or band pass filter 26 is provided in the output circuit of the detector. With this filter there is delivered to the input circuit of an amplifier 27 a voltage which is proportional to the power delivered through the circuit 10 and may be measured by the meter 28.

The modified output connection of Fig. 3 is adapted to measure the power delivered by the radio frequency circuit 10 over a period of time. In this arrangement, the output current of an amplifier 30 charges a large condenser 31. When the charge on this condenser attains a predetermined value, a neon tube 32 discharges and operates a counter 33, which may be either an electrical or a mechanical device. This discharges the condenser to the point where the discharge of the neon tube 32 is interrupted. The number of times the counter is operated through discharge of the tube 32 indicates the power delivered during the period of time under consideration. Otherwise stated, definite quantities of electricity are measured at each discharge of the tube and, since the quantity is proportional to the current times the time, the number of discharges is a measure of the energy delivered by the circuit. It is, of course, apparent that a trigger circuit, or other suitable means, may be utilized instead of the gas tube.

For deriving the current and voltage responsive potentials for operation of the measuring system, a series resistor 35 and a shunt resistor 36 may be provided, as indicated by the modified connection of Fig. 4.

In a mixer tube such as the device 18 of Fig. 1, the plate current may be assumed to have a value of A, in the absence of alternating current grid potential. When a voltage FB is applied to the No. 1 grid, the plate current due to the voltage on this grid equals $$A [1+B \cos (2 \pi FBt)]$$

When a voltage FR is applied to the No. 3 grid, the current to the plate will be $$I_p = A[1+B \cos (2\pi FBt)][1+C \cos (2\pi FRt)]$$
$$= A[1+B \cos (2\pi FBt) +C \cos (2\pi FRt) +BC \cos (2\pi FBt) \cos (2\pi FRt)]$$
$$= A \left\{ 1+B \cos (2\pi FBt) +C \cos (2\pi FRt) + \frac{BC}{2} \cos [2\pi t(FR+FB)] + \frac{BC}{2} \cos [2\pi t(FR-FB)] \right\}$$

This means that the current has (1) a zero frequency component A, as before, (2) a component having a frequency FB which is not used, (3) a component having a frequency FR which is selected out by the tuned circuit 22 coupled to the plate circuit of the tube, (4) an upper side band or sum frequency (FR+FB) which is not used, (5) a lower side band or difference frequency (FR−FB) which is selected by the second tuned circuit 23. It will be noticed that the amplitudes of the sum and difference frequencies are proportional to the product of the amplitudes of the frequencies applied to the grids of the tubes.

In this particular instance, the amplitude of (FR−FB) is proportional to the amplitude of FR_E times the amplitude of FB. FB is constant, so FR−FB is proportional only to the amplitude of the voltage E across the line 10.

In the balanced modulator tubes 13 and 14, the plate current of each tube will contain the five components, as in the previous mixer considered:

(1) Zero frequency
(2) FA
(3) FR
(4) FR+FA
(5) FR−FA

From the symmetry of the circuit, it will be apparent that the FR component from one tube will cause a coupling to the selective circuit coupled to the plates of the tubes opposing the coupling from the other tube. With a proper balance, no component FR will appear at the grid of the following tubes. By proper choice of FA, it will not get through the selective circuit. Therefore, only (FR−FA) and (FR+FA) will appear at the grid of the following tube from these tubes. The amplitude of these side bands is proportional to the product of the current in the current coil and the voltage from FA, which is constant. The component FR supplied to the mixer tube 21 will have the same frequency as the FR component that was balanced out, but the phase will be that corresponding to the voltage across the voltage coil. Thus, if the current and voltage under measurement are in phase, the supplied FR will have the same phase as the suppressed FR. If the voltage and current were out of phase by an angle $\theta$, the FR supplied will be out of phase with the suppressed FR by the same angle $\theta$. Similar to the previous case, the resultant sum and difference frequencies will have amplitudes proportional to the amplitude of FR, or I.

Four frequencies, FR+FA, FR−FA, FR, and FR−FB, are applied to the mixer tube 21.

In the plate current, there will appear the components FR+FA, FR−FA, FR, and FR−FB.

The sum and difference frequencies possible are as follows:

$$(FR+FA)+(FR-FA)=2FR^*$$
$$(FR+FA)-(FR-FA)=2FA^*$$
$$(FR+FA)+FR=2FR+FA^*$$
$$(FR+FA)-FR=FA^*$$
$$(FR+FA)+(FR-FB)=2FR+FA-FB$$
$$(FR+FA)-(FR-FB)=FA+FB$$
$$(FR-FA)+FR=2FR-FA^*$$
$$(FR-FA)-FR=FA^*$$
$$(FR-FA)+(FR-FB)=2FR-FA-FB$$
$$(FR-FA)-(FR-FB)=-FA+FB$$
$$FR+(FR-FB)=2FR-FB$$
$$FR-(FR-FB)=FB$$

*These frequencies will not appear with a truly linear tube, because they are sums and differences of frequencies applied to the same grid. Even with a poor tube, they cause no trouble, because of selective circuits.

Considering the amplitudes of the three frequencies FB+FA, FB−FA and FB, the amplitude of (FB+FA) is proportional to the amplitude of (FR−FB) times the amplitude of (FR+FA), or E times I.

Likewise, (FB−FA) is proportional to the amplitude of (FR−FB) times the amplitude of (FR−FA), or E times I.

FB is proportional to the amplitude of FR times the amplitude of FR−FB, or E times E. As long as FB is large, its amplitude is unimportant, as previously indicated.

Applied to the diode detector 25, we have three frequencies which may be considered as carrier, and upper and lower side bands:

| | Frequency | Amplitude | Phase relations |
|---|---|---|---|
| (1) | FB | Proportional to $E \times E$ | Out of phase with normal carrier by angle $\theta$. |
| (2) | FB+FA | Proportional to $E \times I$ | Proper phase with normal carrier. |
| (3) | FB−FA | Proportional to $E \times I$ | Proper phase with normal carrier. |

As previously indicated, this group of frequencies selected by the tuned secondary of the transformer 24 are applied to the detector 25, and the audio frequency output through the filter 26 is proportional to the power delivered through the circuit 10.

I claim as my invention:

1. In a radio frequency power measuring system, the combination of means for deriving radio frequency potentials proportional respectively to the voltage and current of the power to be measured, means for deriving from said current proportional potential side band components of amplitudes proportional to said current, means for deriving from said voltage responsive potential a radio frequency component whose phase is determined by said voltage, means for mixing said components, and means for detecting the resultant of said mixed components.

2. In a radio frequency power measuring system, the combination of means for deriving radio frequency potentials proportional respectively to the voltage and current of the power to be measured, means including a balanced modulator for deriving from said current proportional potential side band components of amplitudes proportional to said current, means for deriving from said voltage proportional potential radio and side band frequency components having amplitudes proportional to said voltage, means for mixing said component voltages, and means for detecting and indicating the resultant of said detected voltages.

3. In a radio frequency power measuring system, the combination of means for deriving radio frequency potentials proportional respectively to the voltage and current of the power to be measured, means for deriving from said current proportional potential side band components of amplitudes proportional to said current, means for combining with said side band components a radio frequency component which is in phase with said voltage, means including an oscillation generator for deriving from said voltage proportional potential a side band component of an amplitude proportional to said voltage, means for combining said components, and means for detecting the resultant of said combined components.

4. In a radio frequency power measuring system, the combination of means for deriving radio frequency potentials proportional respectively to the voltage and current of the power to be measured, means for deriving from said current proportional potential side band components of amplitudes proportional to said current, means for combining with said side band components a radio frequency component which is in phase with said voltage, means including an oscillation generator for deriving from said voltage proportional potential a side band of an amplitude proportional to said voltage, means for mixing said components, means for detecting the resultant of said components, and means for excluding, from said resultant, spurious frequency components produced by change in the phase of the voltage of said radio frequency power.

5. In a radio frequency power measuring system, the combination of means for deriving radio frequency potentials proportional respectively to the voltage and current of the power to be measured, means for deriving from said current proportional potential side band components of amplitudes proportional to said current, means for deriving from said voltage responsive potential a radio frequency component in phase with said voltage, means for mixing said components, means for detecting the resultant of said mixed components, and means for excluding, from said resultant, spurious frequency components produced by change in the phase of the voltage of said radio frequency power.

6. In a radio frequency power measuring system, the combination of means for deriving radio frequency potentials proportional respectively to the voltage and current of the power to be measured, means for deriving from said current proportional potential side band components of amplitudes proportional to said current, means for deriving from said voltage responsive potential a side band component proportional to said voltage, means for mixing said components, and means for detecting the resultant of said mixed components.

7. In a radio frequency power measuring system, the combination of means for deriving radio frequency potentials proportional, respectively, to the voltage and current of the power to be measured, means for deriving side band components from one of said potentials, means for deriving a radio frequency potential whose phase is determined by the other of said potentials, means for mixing said derived components, and means for detecting the resultant of said mixed components.

8. In a radio frequency power measuring system, the combination of means for deriving radio frequency potentials proportional, respectively, to the voltage and current of the power to be measured, means for deriving side band components from one of said potentials, means for deriving radio and other side band frequency components from the other of said potentials, means for mixing said derived components, and means for detecting and indicating the resultant of said detected components.

WINFIELD R. KOCH.